US008887755B2

(12) United States Patent
Nguyen et al.

(10) Patent No.: US 8,887,755 B2
(45) Date of Patent: Nov. 18, 2014

(54) IN-LINE REPAIRABLE METAL SEATED FLOATING BALL VALVE

(75) Inventors: Vinh Van Nguyen, Houston, TX (US); Stanley C. Allen, Houston, TX (US)

(73) Assignee: Bray International, Inc., Houston, TX (US)

( * ) Notice: Subject to any disclaimer, the term of this patent is extended or adjusted under 35 U.S.C. 154(b) by 120 days.

(21) Appl. No.: 13/492,579

(22) Filed: Jun. 8, 2012

(65) Prior Publication Data

US 2012/0313026 A1     Dec. 13, 2012

Related U.S. Application Data

(60) Provisional application No. 61/494,466, filed on Jun. 8, 2011.

(51) Int. Cl.
*F16K 5/06*     (2006.01)

(52) U.S. Cl.
CPC .................................. *F16K 5/06* (2013.01)
USPC .. 137/315.21; 251/174; 251/181; 251/315.12

(58) Field of Classification Search
CPC ............................ F16K 5/0636; F16K 5/201
USPC ............... 137/315.18, 315.19, 315.2, 315.21; 251/174, 176, 180, 181, 315.12, 359
See application file for complete search history.

(56) References Cited

U.S. PATENT DOCUMENTS

| | | | |
|---|---|---|---|
| 3,219,055 A * | 11/1965 | Dumm | 137/315.2 |
| 3,838,844 A | 10/1974 | Arn | |
| 3,985,334 A * | 10/1976 | Domyan | 251/159 |
| 4,390,039 A * | 6/1983 | Johnson et al. | 137/315.21 |
| 4,524,946 A * | 6/1985 | Thompson | 251/88 |
| 4,566,482 A * | 1/1986 | Stunkard | 137/315.21 |
| 4,867,414 A | 9/1989 | Hubacek | |
| 4,953,587 A | 9/1990 | Steele | |
| 5,338,003 A | 8/1994 | Beson | |
| 6,095,493 A | 8/2000 | Velan | |
| 7,093,819 B1 | 8/2006 | Hall et al. | |
| 7,249,751 B2 | 7/2007 | Hall et al. | |
| 7,267,323 B1 | 9/2007 | O'Callaghan | |
| 7,635,113 B2 | 12/2009 | Bearer et al. | |
| 2006/0237677 A1 | 10/2006 | Williams, Jr. et al. | |
| 2010/0117019 A1 | 5/2010 | Hubacek et al. | |

OTHER PUBLICATIONS

Kwak, Seong Ryong, International Search Report, Dec. 6, 2012, 3 pages, Korean Intellectual Property Office, Daejeon, Republic of Korea.

(Continued)

*Primary Examiner* — John K Fristoe, Jr.
*Assistant Examiner* — Reinaldo Sanchez-Medina
(74) *Attorney, Agent, or Firm* — Mark A. Oathout; Oathout Law Firm

(57) ABSTRACT

A metal seated floating ball valve for in-line repair has a valve body, a ball mounted in the valve body, a stem connected to the ball, and a bonnet connected to the valve body. The floating ball valve further has a first seat and a second seat adjacent the ball mounted in the valve body, an energizing ring mounted in the valve body proximate the first seat and in series with the first seat and the second seat, and a valve seat bias mounted in the valve body proximate the energizing ring and in series with the energizing ring. The energizing ring may have a slot near the upper end and a wedge surface along the lower end.

16 Claims, 9 Drawing Sheets

(56) References Cited

OTHER PUBLICATIONS

Kwak, Seong Ryong, Written Opinion of the International Searching Authority, Dec. 6, 2012, 4 pages, Korean Intellectual Property Office, Daejeon, Republic of Korea.
Velan, Securaseal Metal-seated ball valves, 2010, 28 pages, Velan, Montreal, Canada.
Velan, Velan One-Piece Forged Metal-Seated Power Ball Valves, 2004, pp. 4-5, Velan, Montreal, Canada.
Conval, World Class Camseal Ball Valves, 2008, 6 pages, Conval Inc., Somers, CT, USA.
Mogas Industries, Inc., Innovation by Design: Improved RSVP, 2006, 1 page, Mogas Industries, Inc., Houston, TX, USA.

* cited by examiner

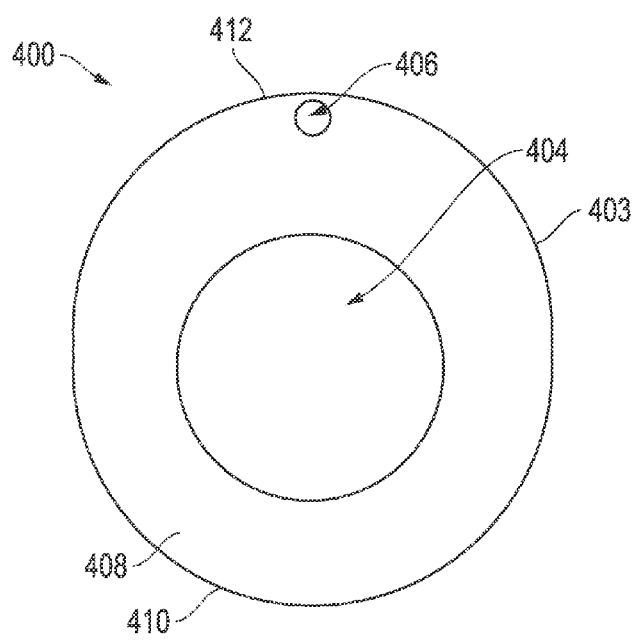
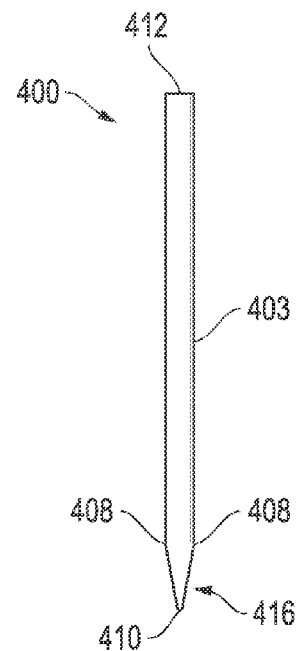
FIG. 7    FIG. 8
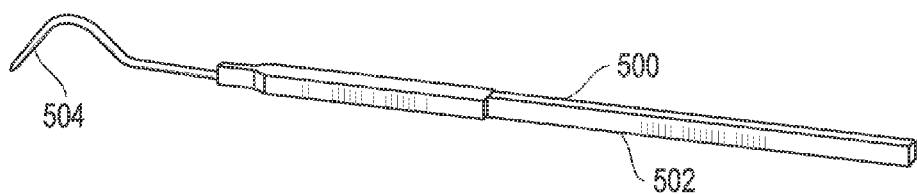
FIG. 9

IN-LINE REPAIRABLE METAL SEATED FLOATING BALL VALVE

CROSS-REFERENCE TO RELATED APPLICATIONS

This application claims the benefit of U.S. Provisional Application No. 61/494,466 filed Jun. 8, 2011.

STATEMENTS REGARDING FEDERALLY SPONSORED RESEARCH OR DEVELOPMENT

Not Applicable

NAMES OF THE PARTIES TO A JOINT RESEARCH AGREEMENT

Not Applicable

REFERENCE TO A "SEQUENCE LISTING", A TABLE, OR A COMPUTER PROGRAM

Not Applicable

BACKGROUND

Ball valves are well known in the industry (e.g. the power utility industry such as for use in lines conducting steam or super-heated steam, the refining industry, etc.). In a ball valve, a ball having an aperture therethrough is placed in a flow path of the valve. The ball may be rotated by a valve stem which penetrates the valve body. The valve stem may rotate the ball from the open position, wherein the aperture through the ball is in alignment with the flow path, to a closed position, wherein a solid portion of the ball is in line with the flow path. The ball and at least a portion of a ball seat that seals the ball in the valve may be installed and removed through the flow path of the valve. Therefore, in order to repair and/or replace the ball and/or the ball seat in the valve, the valve must be at least partially removed from the piping. There is a need for a ball valve that can be efficiently maintained and repaired while ball valve remains in-line, i.e., coupled to the piping.

BRIEF SUMMARY

A metal seated floating ball valve for in-line repair has a valve body, a ball mounted in the valve body, a stem connected to the ball, and a bonnet connected to the valve body. The floating ball valve further has a first seat and a second seat adjacent the ball mounted in the valve body, an energizing ring mounted in the valve body proximate the first seat and in series with the first seat and the second seat, and a valve seat bias mounted in the valve body proximate the energizing ring and in series with the energizing ring. The energizing ring may have a slot near the upper end and a wedge surface along the lower end.

BRIEF DESCRIPTION OF THE SEVERAL VIEWS OF THE DRAWINGS

The embodiments may be better understood, and numerous objects, features, and advantages made apparent to those skilled in the art by referencing the accompanying drawings. These drawings are used to illustrate only typical embodiments of this invention, and are not to be considered limiting of its scope, for the invention may admit to other equally effective embodiments. The figures are not necessarily to scale and certain features and certain views of the figures may be shown exaggerated in scale or in schematic in the interest of clarity and conciseness.

FIG. 7 is an elavational view of one embodiment of an energizing ring.

FIG. 8 is a side view of the embodiment shown in FIG. 7.

FIG. 9 is a schematic view of one embodiment of an energizing ring removal tool.

DESCRIPTION OF EMBODIMENT(S)

The description that follows includes exemplary apparatus, methods, techniques, and instruction sequences that embody techniques of the inventive subject matter. However, it is understood that the described embodiments may be practiced without these specific details.

Figure 1:
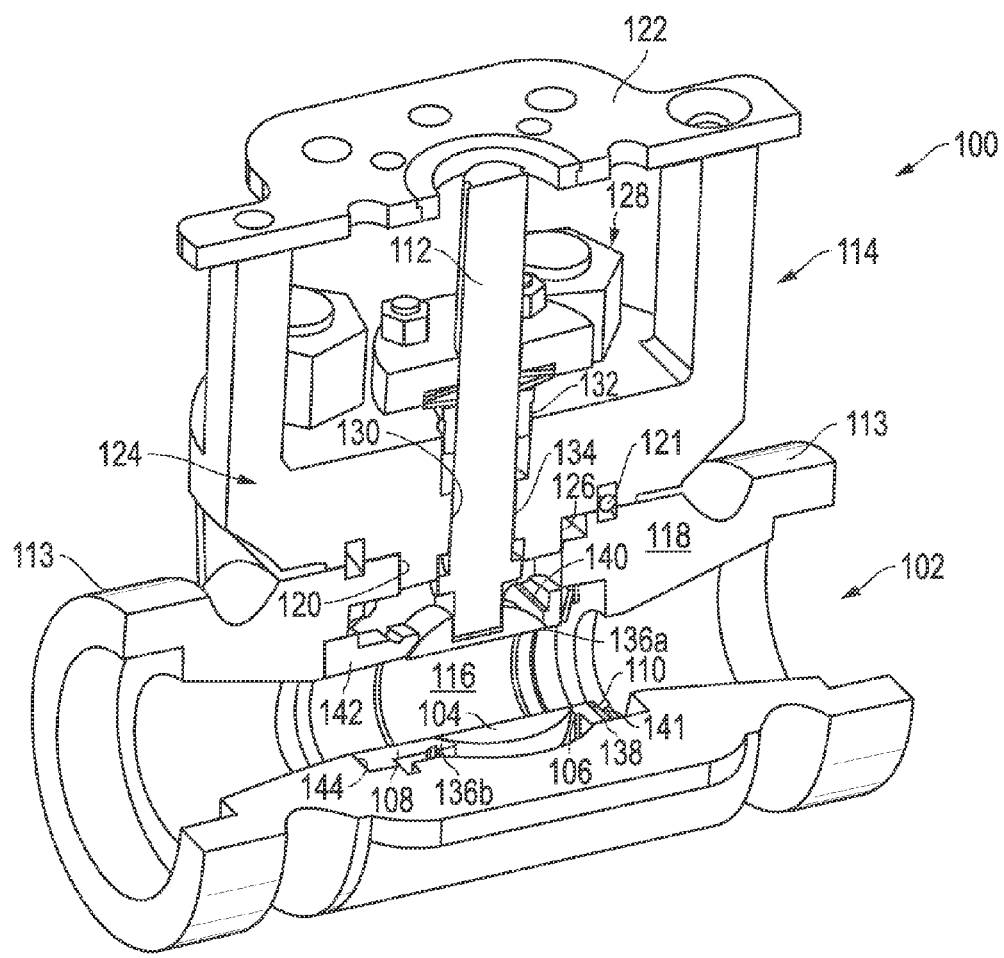
FIG. 1 depicts a schematic, perspective view partially in cross section of a ball valve.

FIG. 1 depicts a schematic view partially in cross section of an in-line floating ball valve 100. The ball valve 100 is shown in an open position whereby a flow path 102 through the valve 100 allows fluids to flow through. The valve 100 may have a ball 104, a first valve seat 106 (or spring seat), a second valve seat 108 (or primary sealing seat), a valve seat bias 110, a valve stem 112, two connector ends 113, and a bonnet 114. The ball 104 is shown in the open position. In the open position, an aperture 116 allows fluids to flow through the valve 100 via the flow path 102. In the closed position, the ball 104 may be rotated ninety (90) degrees thereby sealing the flow path 102 with a solid portion of the ball 104 against the first valve seat 106 and/or the second valve seat 108. The valve stem 112 may penetrate a valve body 118 through an access way 120 in the valve body 118. An actuator (not shown) may couple to the valve stem 112 in order to actuate the ball 104 between the open position and the closed position. The connector ends 113 as shown are configured to weld to piping (not shown), although it should be appreciated that the connector ends 113 may be any suitable connection including, but not limited to, butt welds, socket welds, bolt on flanges, and the like.

The access way 120, as shown in FIG. 1, may be configured to allow the ball 104, the first seat 106, the second seat 108 and/or the valve seat bias 110 to be removed from the valve 100 when the connector ends 113 are coupled to a piping system, as will be described in more detail below. The first seat 106 and the second seat 108 may, for example, be made of any periodic chart based metal.

The bonnet 114 may be configured to secure to the valve 100 proximate the access way 120. The bonnet 114 may seal the access way 120 with a seal member 121 (such as, for example, a body gasket) while allowing the valve stem 112 to access the ball 104. The bonnet 114 may have an actuator portion 122 and a valve portion 124. The actuator portion 122 may be configured for coupling an actuator to the bonnet 114 and thereby the valve stem 112. The valve portion 124 may be configured to secure the bonnet 114 to the valve 100 while sealing the access way 120. The valve portion 124 may have an access way engagement portion 126, one or more connectors 128, and a valve stem aperture 130. The access way engagement portion 126 may partially secure within the access way 120 thereby substantially preventing fluids from exiting the flow path 102. In addition a sealing means may be provided below metal ring 132, and/or the seal member 121, may be provided to further prevent fluids from exiting the access way 120. The one or more connectors 128, as shown, may be multiple nuts and bolts for securing the bonnet 114 to the valve 100.

The valve stem aperture 130 may be an opening in the valve portion 124 of the bonnet 114 that allows the valve stem 112 to pass therethrough. A bearing 134, or multiple bearings, may also be provided to assist in the sealing and/or supporting the rotation of the valve stem 112 through the bonnet 114.

The first valve seat 106, as shown, is a substantially ring shaped member having a seat surface 136a and a bias engagement portion 138. The seat surface 136a may be configured to engage the outer surface of the ball 104 and prevent fluid from passing between the seat surface 136a and the ball 104. The bias engagement portion 138 may be configured to engage the valve seat bias 110. The valve seat bias 110 may bias the first valve seat 106 into sealing engagement with the ball 104. The valve seat bias 110 may be one piece, a split ring, and/or have multiple pieces. For example, the valve seat bias 110 may have two pieces that may come apart. Taking the pieces apart assists in installing and/or removing the valve seat bias 110. The first valve seat 106 may also have a shoulder 140. The shoulder 140 may allow an operator, or worker, to engage the first valve seat 106 with a removal tool 300 (see FIG. 3) in order to compress the valve seat bias 110. With the valve seat bias 110 compressed, the ball 104 may be removed from the valve 100 as will be discussed in more detail below. The valve seat bias 110 may be any suitable type of biasing member including, but not limited to, one or more Belleville springs, one or more wave rings, one or more coiled springs, one or more wave springs or wave rings, one or more elastomeric members, one or more leaf springs, any combination thereof, and the like. In addition or as an alternative there may be a second valve seat bias such as a wave ring 301 (see FIG. 3) for biasing the first valve seat 106. A spacer 141 may separate the valve seat bias 110 from the wave ring 301, or the wave ring 301 may engage the valve seat bias 110 directly. The spacer 141 may be a stationary rigid member, a floating ring, or any other suitable device. Although, the second valve seat bias is shown as the wave ring 301, it should be appreciated that any suitable device, or combination of devices may be used as the second valve seat bias including but not limited to, any number of Belleville springs (for example four successive Belleville springs), one or more coiled springs, a plurality of wave springs or wave rings, one or more elastomeric members, one or more leaf springs, any combination thereof, and the like. The second valve seat bias, such as the wave ring 301, allows for greater travel of the second valve seat 106 via compression.

The second valve seat 108, as shown, is a substantially cylindrical shaped member having a seat surface 136b and a base portion 142. The seat surface 136b may be configured to engage the outer surface of the ball 104 and preventing fluid from passing between the seat surface 136a and the ball 104. The base portion 142 may be configured to rigidly engage an inner shoulder 144 of the valve 100. The base portion 142 could include a layer formed by a stainless steel weld, or a buffer integrally united with the second valve seat 108. The second valve seat 108 may be configured to remain stationary in the valve 100 until it is removed from the valve 100.

Figure 2:
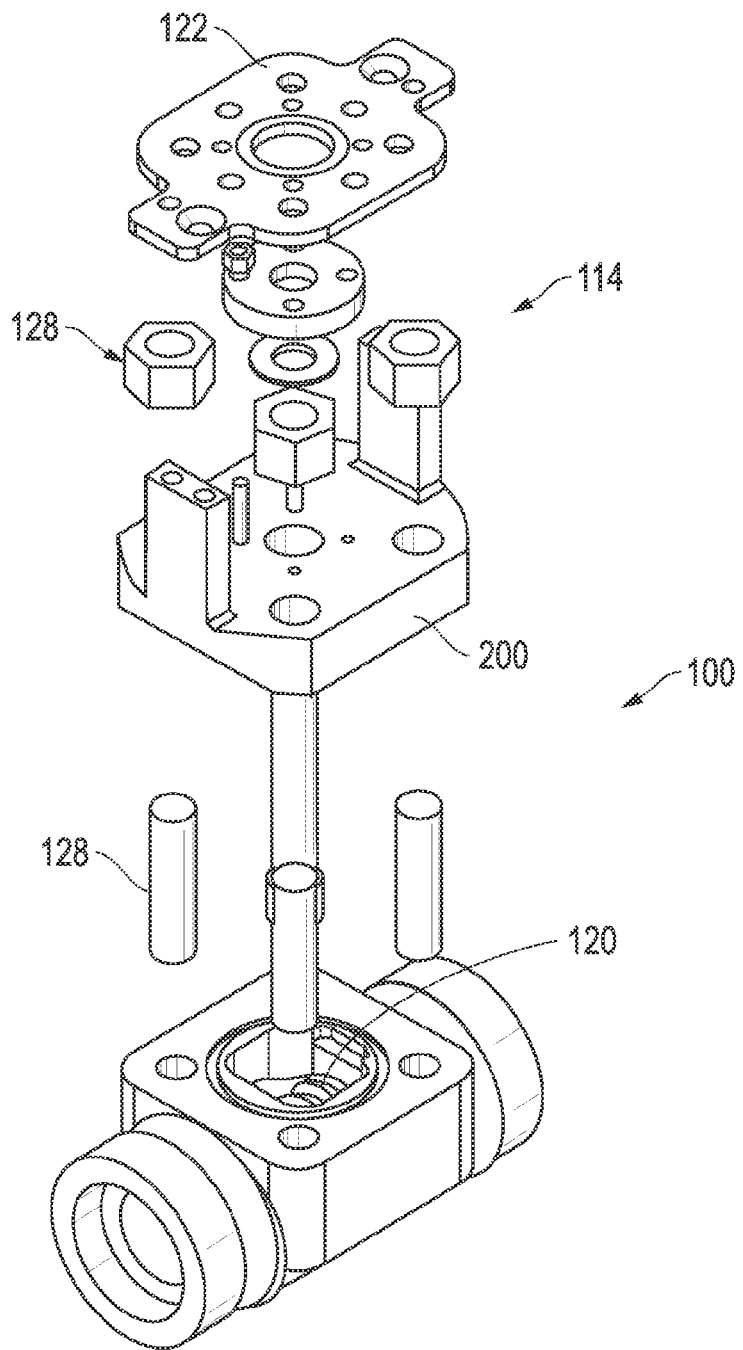
FIG. 2 is an exploded perspective view of the ball valve.

FIG. 2 depicts the valve 100 having the bonnet 114 removed in preparation for removing the ball 104 (as shown in FIG. 1), the first valve seat 106 (as shown in FIG. 1) and/or the second valve seat 108 (as shown in FIG. 1). To remove the ball 104 (as shown in FIG. 1), the one or more connectors 128 may be uncoupled allowing the bonnet 114 to be removed from the valve 100. The bonnet 114 as shown has a top bonnet flange 200. With the bonnet 114 removed from the valve 100, the access way 120 on the valve 100 may be accessible. The access way 120 may allow the operator, or worker, to access and remove the ball 104, the first valve seat 106 and/or the second valve seat 108.

Figure 3:
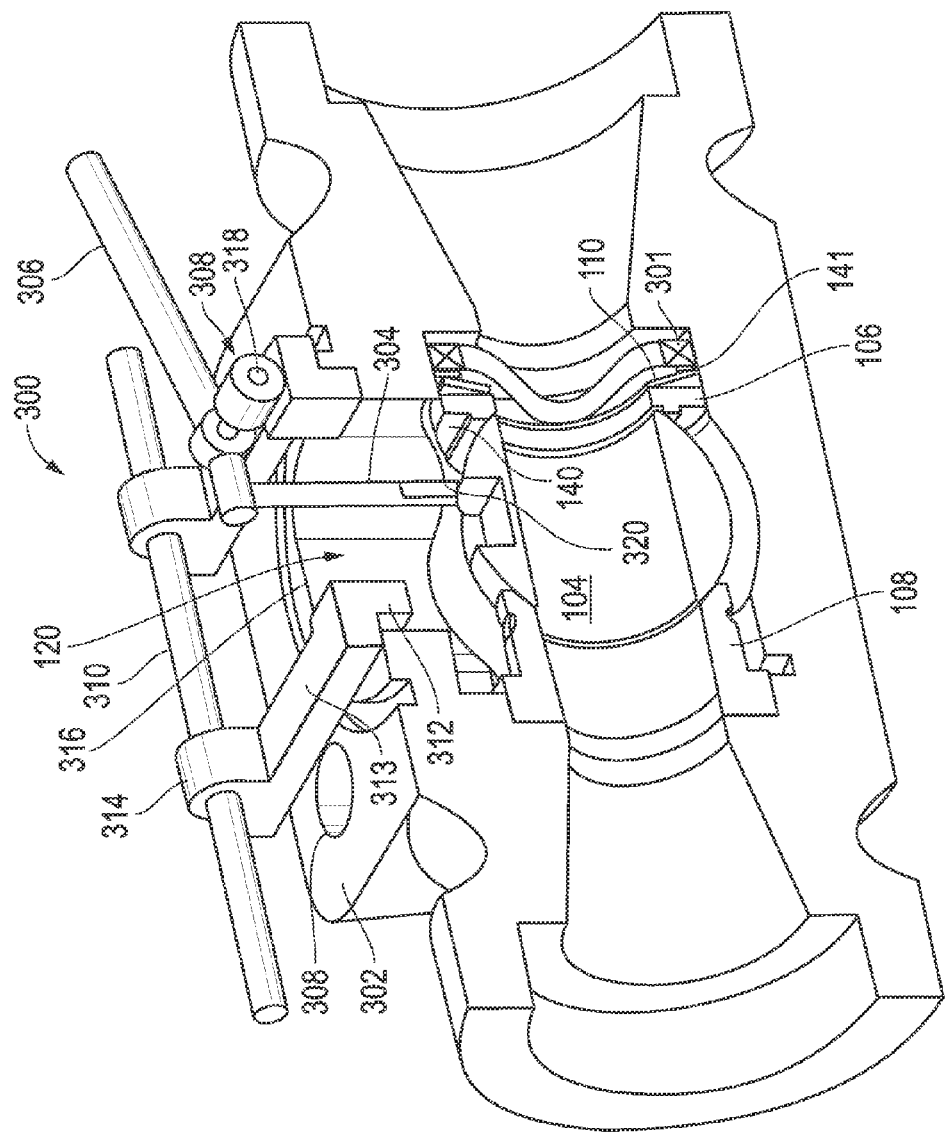
FIG. 3 is a perspective, cross sectional view of the ball valve.

FIG. 3 depicts the valve 100 configured for removal of the ball 104 (i.e. having the bonnet 114 as shown in FIGS. 1 and 2 removed), the first valve seat 106 and/or the second valve seat 108. A removal tool 300 may be mounted from a top surface 302 of the valve 100. The removal tool 300 may assist in removing the ball 104, the first valve seat 106 and/or the second valve seat 108.

The removal tool 300 may have a motive member 304, an actuator 306, a plurality of frame members 308, and a support rod 310. As shown, the frame members 308 each have an opening portion 312, a support member 313 and a connector portion 314. The opening portion 312 may be configured to enter the access way 120. The opening portion 312 may be specifically sized to enter and engage an inner perimeter 316 of the access way 120. By engaging the inner perimeter 316, the actuator 306 may have more leverage to actuate the motive member 304 thereby disengaging the first valve seat 106. The support members 313 may couple the opening portion 312 to the connector portion 314. As shown, the support members 313 are substantially rectangular support members. The connector portion 314 may be configured to receive the support rod 310 thereby connecting the frame members 308 to one another. The connector portion 314 may be an aperture in the frame members 308. The support rod 310 may have additional length allowing the distance between the frame members 308 to be adjusted based on the size of the valve 100 and/or size of the access way 120.

The actuator 306 as shown is a lever that moves the motive member 304 when the lever is rotated. As the lever is rotated about a pivot pin 318 the motive member 304 swings toward the first valve seat 106. The motive member 304 may have an engagement portion 320 for engaging the shoulder 140. The engagement portion 320 may be configured to secure the motive member 304 to the first valve seat 106 or directly to the valve seat bias 110. With the engagement portion 320 of the motive member 304 secured to the first valve seat 106 or the valve seat bias 110, continued movement of the lever may compress the valve seat bias 110. With the valve seat bias 110 compressed, the first valve seat 106 is not forced against the ball 104 and the ball 104 may be gripped and removed from the valve 100. With the ball 104 removed from the valve 100, the removal tool 300 may be removed from the valve 100 thereby allowing the first valve seat 106 and/or the second valve seat 108 to be removed from the valve 100. The ball 104, the first valve seat 106, the second valve seat 108, and/or the valve seat bias may then be repaired and/or replaced in the valve 100 and/or further maintenance work may be performed within the flow path 102 or cavity for the ball 104 and seats 106, 108.

Figure 4:
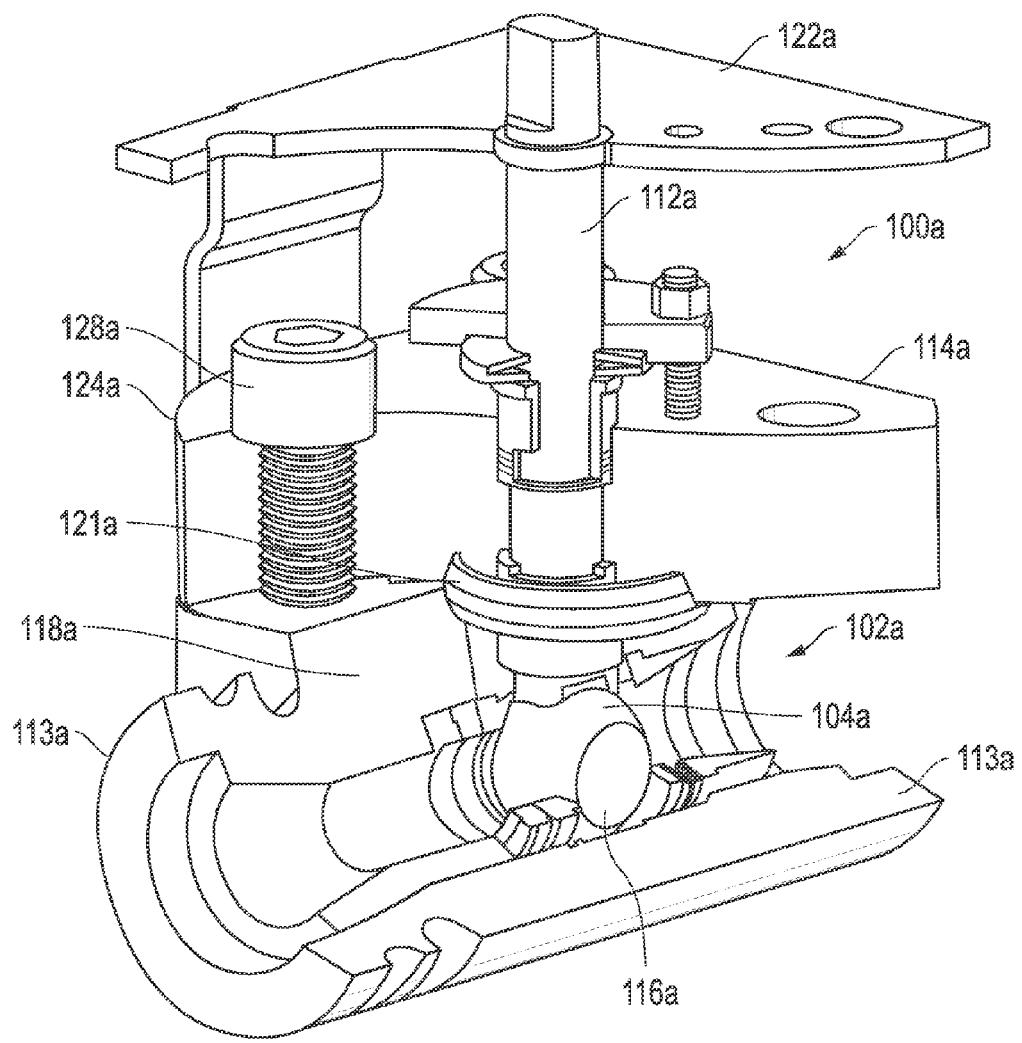
FIG. 4 depicts a schematic, perspective view partially in cross section of another embodiment of a ball valve.
Figure 5:
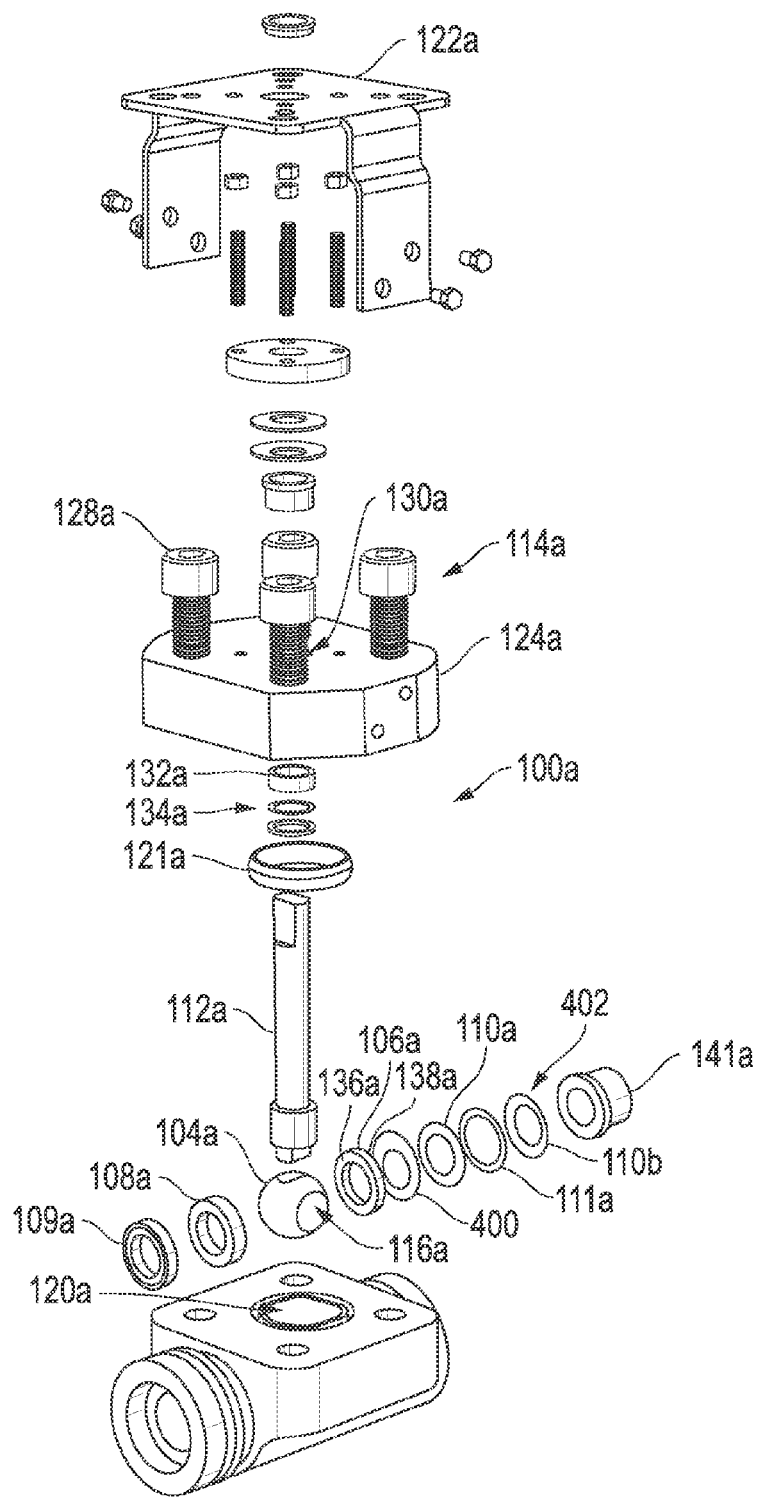
FIG. 5 is an exploded perspective view of the ball valve embodiment of FIG. 4.
Figure 6:
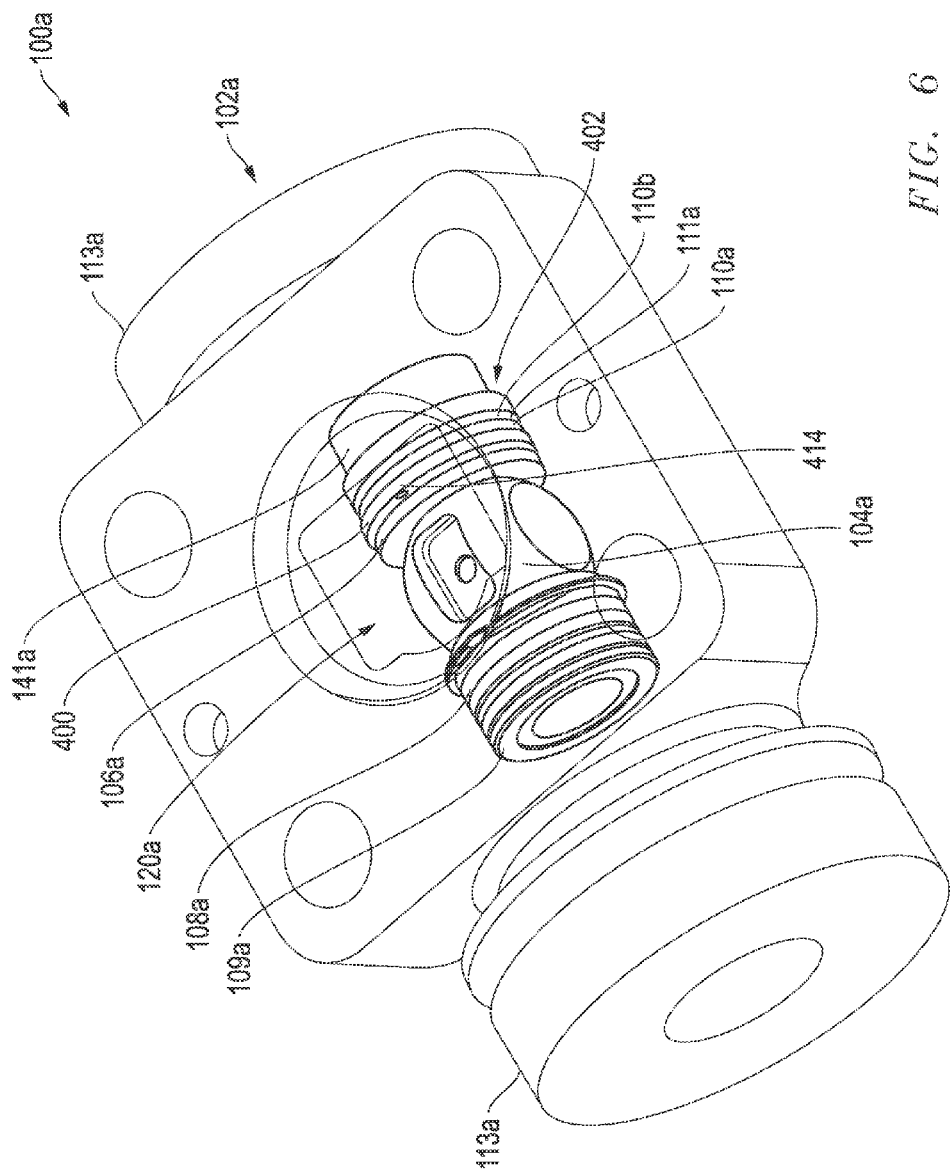
FIG. 6 depicts another schematic, perspective view of the embodiment shown in FIG. 4.

FIGS. 4-6 depict perspective views (FIG. 4 partially in cross section) of another embodiment of the in-line floating ball valve 100a. The ball valve 100a is shown in a closed position whereby a flow path 102a through the valve 100a does not allow fluids to flow through. The valve 100a may, for example, have a ball 104a, a first valve seat 106a (or spring seat), a second valve seat 108a (or primary sealing seat), a seat insert 109a (e.g. a stainless steel ring as a rust protection layer or shield, or layer formed by a stainless steel weld, or a buffer integrally united with the second valve seat 108a), an energizing ring 400, a first valve seat bias 110a, an annular ring or washer 111a, a second valve seat bias 110b, a spacer 141a, a valve stem 112a, two connector ends 113a, and a bonnet 114a. The ball 104a is shown in the closed position. In the closed position, the ball 104a seals the flow path 102a with a solid portion of the ball 104a against the first valve seat 106a and/or the second valve seat 108a. In the open position, the ball 104a may be rotated, e.g., ninety (90) degrees such aperture 116a allows fluids to flow through the valve 100a via the flow path 102a. The valve stem 112a may penetrate a valve body 118a through an access way 120a in the valve body 118a. An actuator (not shown) may couple to the valve stem 112a in order to actuate the ball 104a between the open position and the closed position. The connector ends 113a as shown are configured to weld to piping (not shown), although it should be appreciated that the connector ends 113a may be any suitable connection including, but not limited to, butt welds, socket welds, bolt on flanges, and the like.

The access way 120a, as shown in FIGS. 5 and 6, may be configured to allow the ball 104a, the first seat 106a, the second seat 108a, the energizing ring 400, the first valve seat bias 110a and/or the second valve seat bias 110b to be removed from the valve 100a when the connector ends 113a are coupled to a piping system, as will be described in more detail below. The first seat 106a and the second seat 108a may, for example, be made of metal.

The bonnet 114a may be configured to secure to the valve 100a proximate the access way 120a. The bonnet 114a may seal the access way 120a with a seal member 121a (such as, for example, a body gasket or metal seal gasket) while allowing the valve stem 112a to access the ball 104a. The bonnet 114a may have an actuator portion 122a and a valve portion 124a. The actuator portion 122a may be configured for coupling an actuator to the bonnet 114a and thereby the valve stem 112a. The valve portion 124a may be configured to secure the bonnet 114a to the valve 100a while sealing the access way 120a. The valve portion 124a may have an access way engagement portion (not shown in FIGS. 4-6), one or more connectors 128a, and a valve stem aperture 130a. The access way engagement portion (not shown in FIGS. 4-6) may partially secure within the access way 120a thereby substantially preventing fluids from exiting the flow path 102a. In addition a seal 132a, and/or the seal member 121a, may be provided to further prevent fluids from exiting the flow path 102a. The one or more connectors 128a, as shown, may be multiple nuts and bolts for securing the bonnet 114a to the valve 100a.

The valve stem aperture 130a may be an opening in the valve portion 124a of the bonnet 114a that allows the valve stem 112a to pass therethrough. A bearing 134a, or multiple bearings, may also be provided to assist in the sealing and/or supporting the rotation of the valve stem 112a through the bonnet 114a.

The first valve seat 106a, as shown, is a substantially ring shaped member having a seat surface 136a and an energizing portion 138a. The seat surface 136a may be configured to engage the outer surface of the ball 104a and prevent fluid from passing between the seat surface 136a and the ball 104a. The energizing portion 138a may be configured to engage the energizing ring 400 (or in alternative arrangements a valve seat bias 110 or washer 111a). The energizing ring 400 will energize the seal between the ball 104a and the respective first valve seat 106a and second valve seat 108a when the energizing ring 400 is inserted in series into a sealing series 402 (the sealing series 402 is some combination of the ball 104a, the first valve seat 106a, the second valve seat 108a, the energizing ring 400, together with one or more of the first valve seat bias 110a, and/or the second valve seat bias 110b). In other words the one or more of the first and/or second valve seat bias 110a and 110b may bias the first and second valve seats 106a & 108a into sealing engagement with the ball 104a when the energizing ring 400 is inserted into the sealing series 402.

Referring to FIGS. 7 and 8, an embodiment of the energizing ring 400 is shown. The energizing ring 400 has a body 403 defining a central passageway 404 that may form part of the flow path 102a. The energizing ring 400 further defines a slot 406 used for manipulating, grasping and/or hooking the energizing ring 400 with an energizing ring removal tool 500 (see FIG. 9, which represents one embodiment of an energizing ring removal tool 500 using a handle 502 to manipulate a hooked and tapered end 504 which is used for manipulating, grasping and/or hooking). The slot 406 may or may not be a through-hole, may be a straight hole or a hole formed with two intersecting passageways, may be formed having various shapes including a concave interior surface best adapted for grasping or hooking, or may be formed as a surface adapted for prying. The energizing ring 400 may have one or more tapered edge(s) 408 (two shown with a ten degree taper, by way of example) preferably along the lower end 410. In the currently preferred embodiment the energizing ring 400 forms a wedging device due to the tapered edge(s) 408 forming a wedge surface 416 for insertion and removal from the sealing series 402. The energizing ring 400 may be made without the wedge surface 416. The energizing ring 400 may be made of other shapes (shapes such as ovular or other than the round outer configuration represented in FIG. 7) and may have a tab protruding beyond the upper end 412 (wherein the tab may house the slot 406). The energizing ring 400 may also have a shoulder 414 (see FIG. 6) projecting at a greater radius than the first valve seat 106a. The shoulder 414 may allow an operator, or worker, to manipulate or engage the energizing ring 400 with the removal tool 500 (see FIG. 9) in order to manipulate or compress the first valve seat bias 110a, and/or the second valve seat bias 110b, or to assist in locating the slot 406. The energizing ring 400 may be made of any suitable material (by way of example only, 410 stainless steel).

The removal tool 500 could be any tool used to remove, including a human hand used to grasp, a common screwdriver, or a threaded device.

The first and/or second valve seat bias 110a/110b may be any suitable type of biasing member for spring loading including, but not limited to, one or more Belleville springs, one or more wave rings, one or more coiled springs, one or more wave springs or wave rings, one or more elastomeric members, one or more leaf springs, any combination thereof, and the like. The second valve seat bias 110b is optional for biasing the first valve seat 106a and if excluded then the washer 111a may also be excluded. The washer 111a is optional (i.e. may be excluded) or may separate the first valve seat bias 110a from the second valve seat bias 110b. The first valve seat bias 110a may engage the first valve seat 106a directly in which case the energizing ring 400 may be placed on the opposite side of the first valve seat bias 110a. The spacer 141a is optional (i.e. may be omitted), and if included may be a stationary rigid member, a floating ring, or any other suitable device. The second valve seat bias 110b allows for greater travel of the valve seat 106a via compression and for insertion/removal of the energizing ring 400. More than two valve seat biases may be implemented into the sealing series 402.

Figure 10:
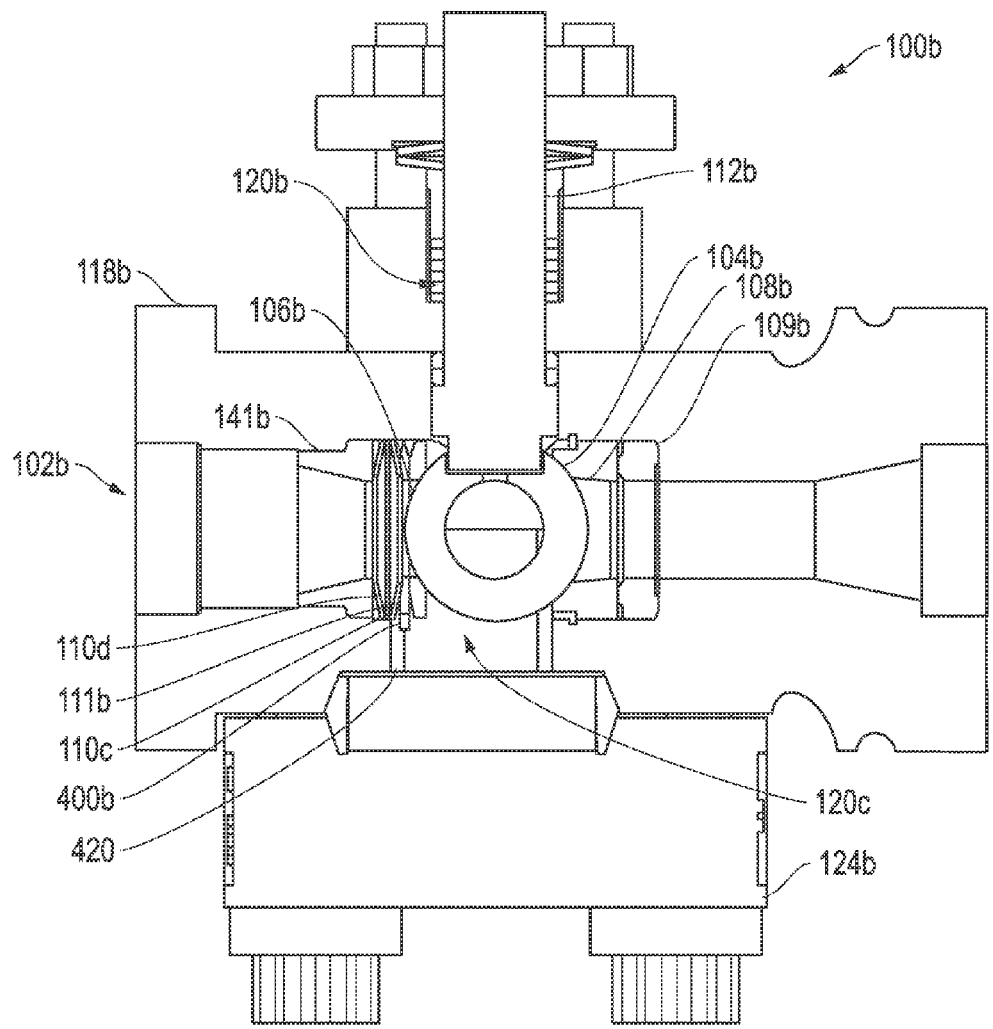
FIG. 10 shows an embodiment for bottom entry.
Figure 10A:
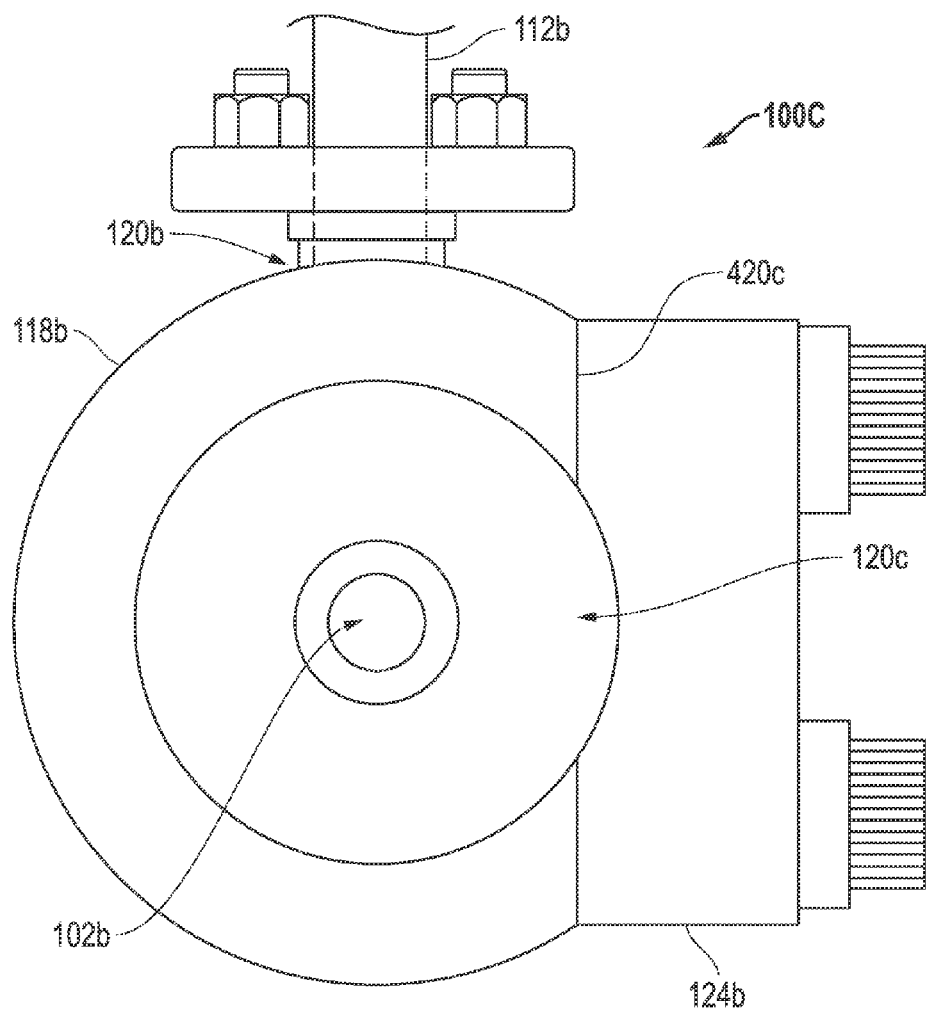
FIG. 10A shows an embodiment for side entry.

FIG. 10 shows an embodiment of a bottom entry in-line floating ball valve 100b. The ball valve 100b is shown in a closed position whereby a flow path 102b through the valve 100 does not allow fluids to flow through. The valve stem 112b may penetrate a valve body 118b through an access way 120b in the valve body 118b. The bottom entry in-line floating ball valve 100b is for bottom removal of the ball 104b, and a first valve seat 106b, and a second valve seat 108b from the valve body 118b, and may, for example, include a seat insert 109b (e.g. a stainless steel ring as a rust protection layer or shield, or layer formed by a stainless steel weld, or a buffer integrally united with the second valve seat 108b), an energizing ring 400b, a first valve seat bias 110c, an annular ring or washer 111b, a second valve seat bias 110d, and/or a spacer 141b. A valve access bonnet 124b is configured to allow access via a bottom 420 of the valve body 118b through secondary access passage 120c for entry and removal of the above described components. It is to be understood that embodiments of the in-line floating ball valve 100b for removal of the ball and seats could also be formed for side entry and removal appearing somewhat similar to FIG. 10 but with the valve access bonnet 124b rotated ninety degrees for example (see FIG. 10A showing secondary access passage 120c via a lateral side 420c of the valve body 188b in an embodiment of a side entry in-line floating ball valve 100c having valve access bonnet 124b formed for side entry).

While the embodiments are described with reference to various implementations and exploitations, it will be understood that these embodiments are illustrative and that the scope of the inventive subject matter is not limited to them. Many variations, modifications, additions and improvements are possible. For example, the techniques used herein may be applied to any valve used for piping systems.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A metal seated floating ball valve for in-line repair, wherein the metal seated floating ball valve has a valve body, a ball mounted in the valve body, a stem connected to the ball, and a bonnet connected to the valve body, comprising:
   a first seat adjacent the ball mounted in the valve body;
   a second seat adjacent the ball mounted in the valve body;
   an energizing ring mounted in the valve body proximate the first seat and in series with the first seat and the second seat, wherein said energizing ring defines a central passageway and a slot;
   a valve seat bias mounted in the valve body proximate said energizing ring and in series with said energizing ring; and
   further comprising a tab protruding beyond an upper end of the energizing ring.

2. The apparatus according to claim 1, further comprising:
   a washer mounted in the valve body proximate the valve seat bias and in series with the valve seat bias; and
   a second valve seat bias mounted in the valve body proximate the washer and in series with the washer.

3. The apparatus according to claim 2, further comprising:
   a seat insert mounted proximate the second seat; and
   a spacer mounted proximate said second valve seat bias.

4. The apparatus according to claim 1, wherein said energizing ring is interposed between the first seat and the valve seat bias.

5. The apparatus according to claim 1, wherein the slot is a through-hole.

6. The apparatus according to claim 1, wherein said energizing ring further comprises a wedge surface.

7. The apparatus according to claim 1, further comprising a second valve seat bias mounted in the valve body wherein an end of the second valve seat bias abuts in opposition an end of the other valve seat bias.

8. The apparatus according to claim 1, further comprising a second valve seat bias mounted in the valve body wherein the second valve seat bias is stacked on top of the other valve seat bias.

9. The apparatus according to claim 1, wherein the valve body has a secondary access passage configured for removal of at least the ball, and wherein the secondary access passage is optionally closed by a valve access bonnet.

10. The apparatus according to claim 9, wherein the secondary access passage is defined through a bottom of the valve body.

11. The apparatus according to claim 9, wherein the secondary access passage is defined through a lateral side of the valve body such that the secondary access passage is configured transverse to the axis of the stem.

12. The apparatus according to claim 1 further comprising an energizing ring removal tool, wherein said energizing ring removal tool includes a handle and a hooked and tapered end.

13. The apparatus according to claim 1, wherein the slot is a hole formed by at least two intersecting passageways.

14. The apparatus according to claim 1, wherein the slot includes a concave interior surface configured for hooking the energizing ring.

15. The apparatus according to claim 1, further comprising:
   a second valve seat bias mounted in the valve body proximate the valve seat bias;
   wherein said energizing ring is interposed between the first seat and the valve seat bias; and
   wherein said energizing ring further comprises a wedge surface.

16. A method for in-line repairing a metal seated floating ball valve, comprising the steps of:
   opening an access way into a valve body of the metal seated floating ball valve;
   removing an energizing ring from the valve body;
   removing a ball mounted in the valve body;
   replacing the ball into the valve body; and
   replacing the energizing ring by wedging the energizing ring in-between a first valve seat and a valve seat bias mounted in the valve body.

* * * * *